United States Patent [19]

Zirps et al.

[11] Patent Number: 5,246,395

[45] Date of Patent: Sep. 21, 1993

[54] METHOD AND MEANS FOR REMOVING CASINGS FROM SAUSAGES

[75] Inventors: Christopher T. Zirps; Matthew K. Haggerty, both of Milton; Massimo A. Russo, Brookline; Karl T. Ulrich, Belmont; Jennie Kwo, Cambridge, all of Mass.

[73] Assignee: Townsend Engineering Company, Des Moines, Iowa

[21] Appl. No.: 778,314

[22] Filed: Oct. 16, 1991

[51] Int. Cl.⁵ ............................................. A22C 11/02
[52] U.S. Cl. ............................................. 452/50
[58] Field of Search ................................. 452/50

[56] References Cited

U.S. PATENT DOCUMENTS

| | | | |
|---|---|---|---|
| 3,023,452 | 3/1962 | James et al. | 452/50 |
| 3,312,995 | 4/1967 | Garey | 452/50 |
| 3,568,242 | 3/1971 | Moore | 452/50 |
| 4,138,767 | 2/1979 | Stiles | 452/50 |

OTHER PUBLICATIONS

Ranger Apollo Parts Catalog AP201-79.

*Primary Examiner*—Willis Little
*Attorney, Agent, or Firm*—Zarley, McKee, Thomte, Voorhees & Sease

[57] ABSTRACT

An apparatus for removing casings from sausages having a frame, and a conduit extending within the frame through which a string of linked sausages are longitudinally moved. A knife means is pivotally mounted in the longitudinal path of the linked sausages and is capable of moving into the recessed portions of the string existing between adjacent ends of the linked product to sever the casing material in that area. A spin jump paddle is pivotally and transversely mounted in the path of the string of sausages downstream from the knife element so that the casings will pass thereover. The paddle has a width greater than its thickness and will rotate from a flat position to a vertical position depending on the portion of a linked product that is passing thereover. The casing material being removed from the linked product passes over the paddle and downwardly to a pair of gripping rolls. Steam is injected into the conduit and diverted through the length thereof to loosen the casing material from the cooked product.

24 Claims, 6 Drawing Sheets

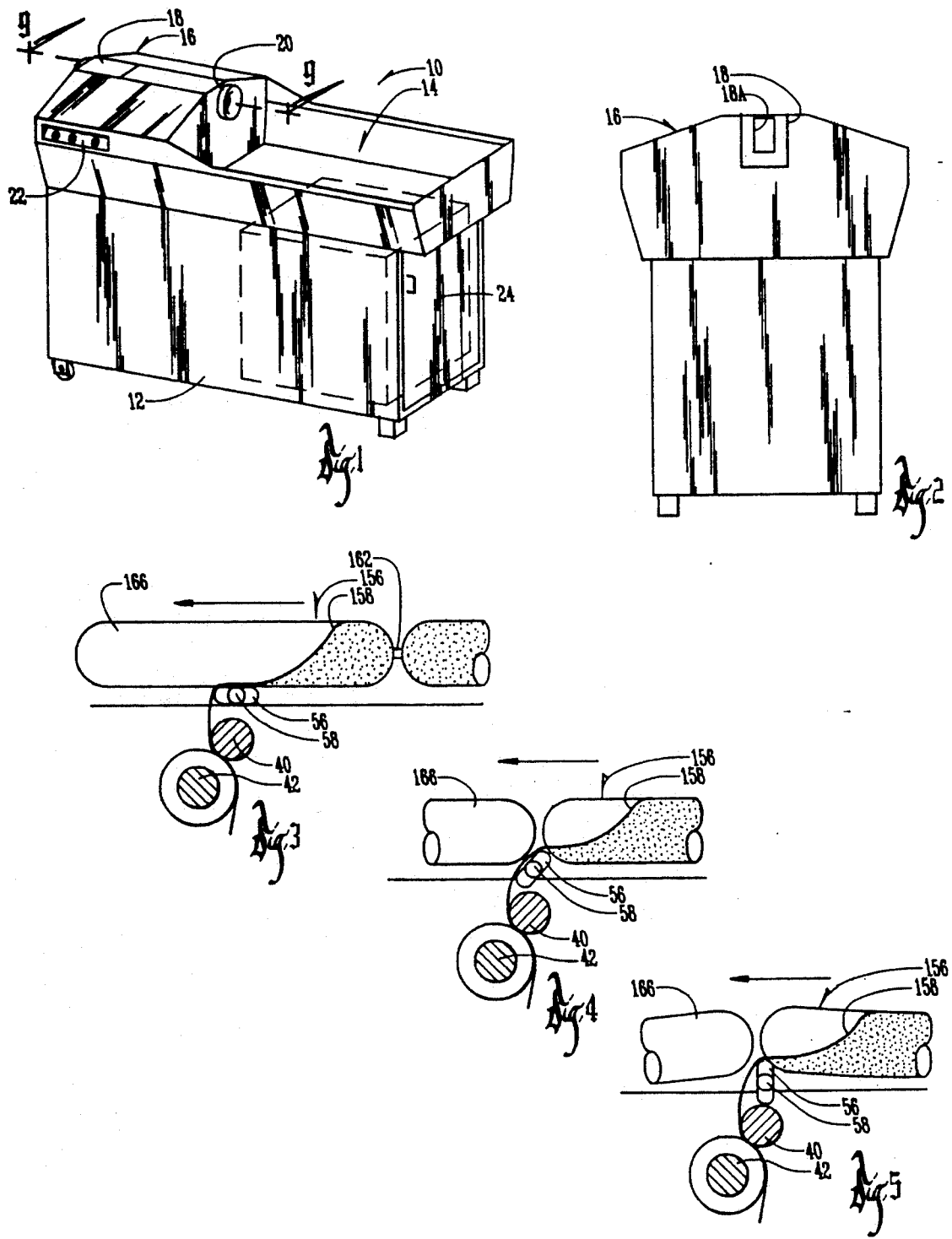

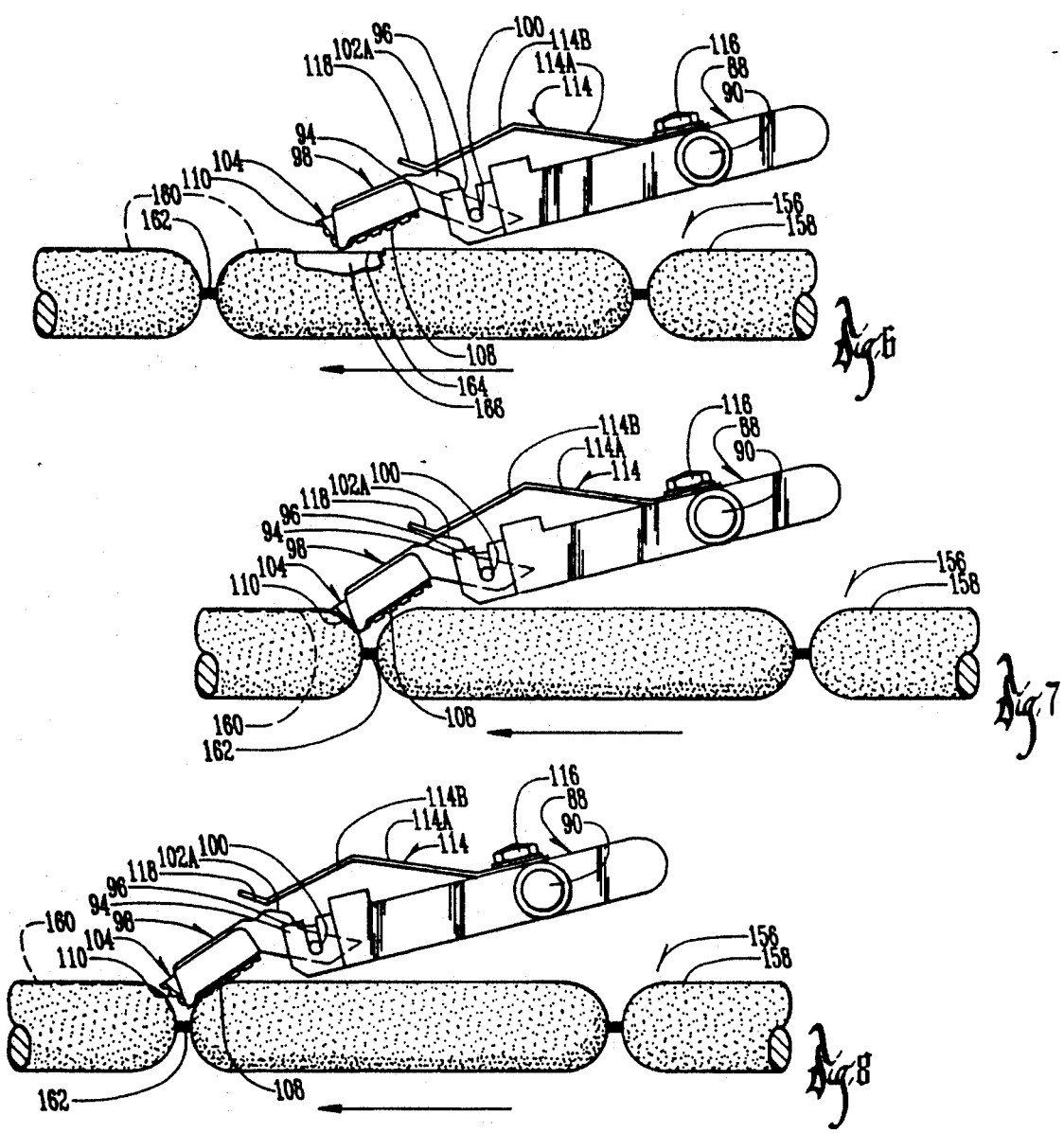

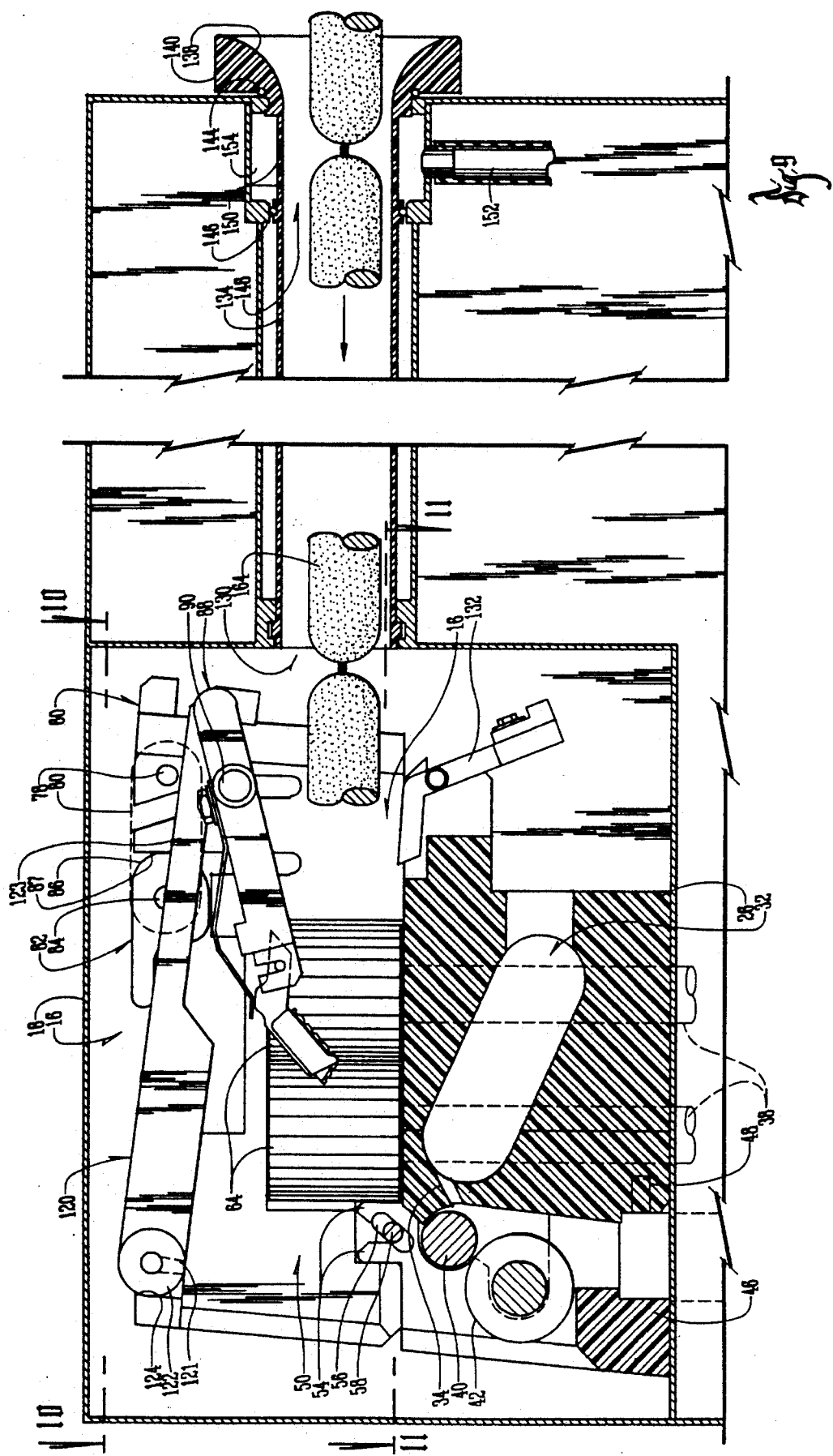

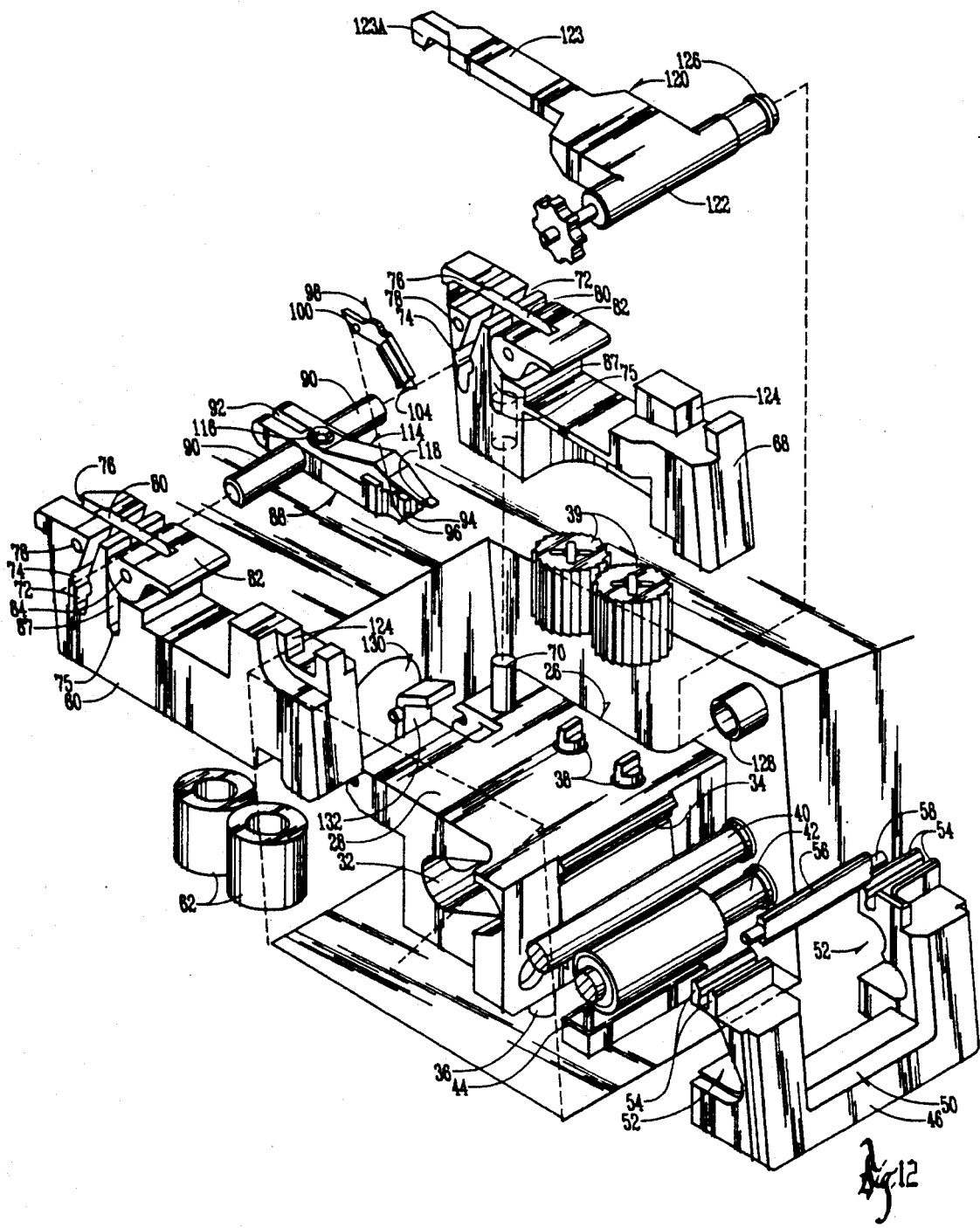

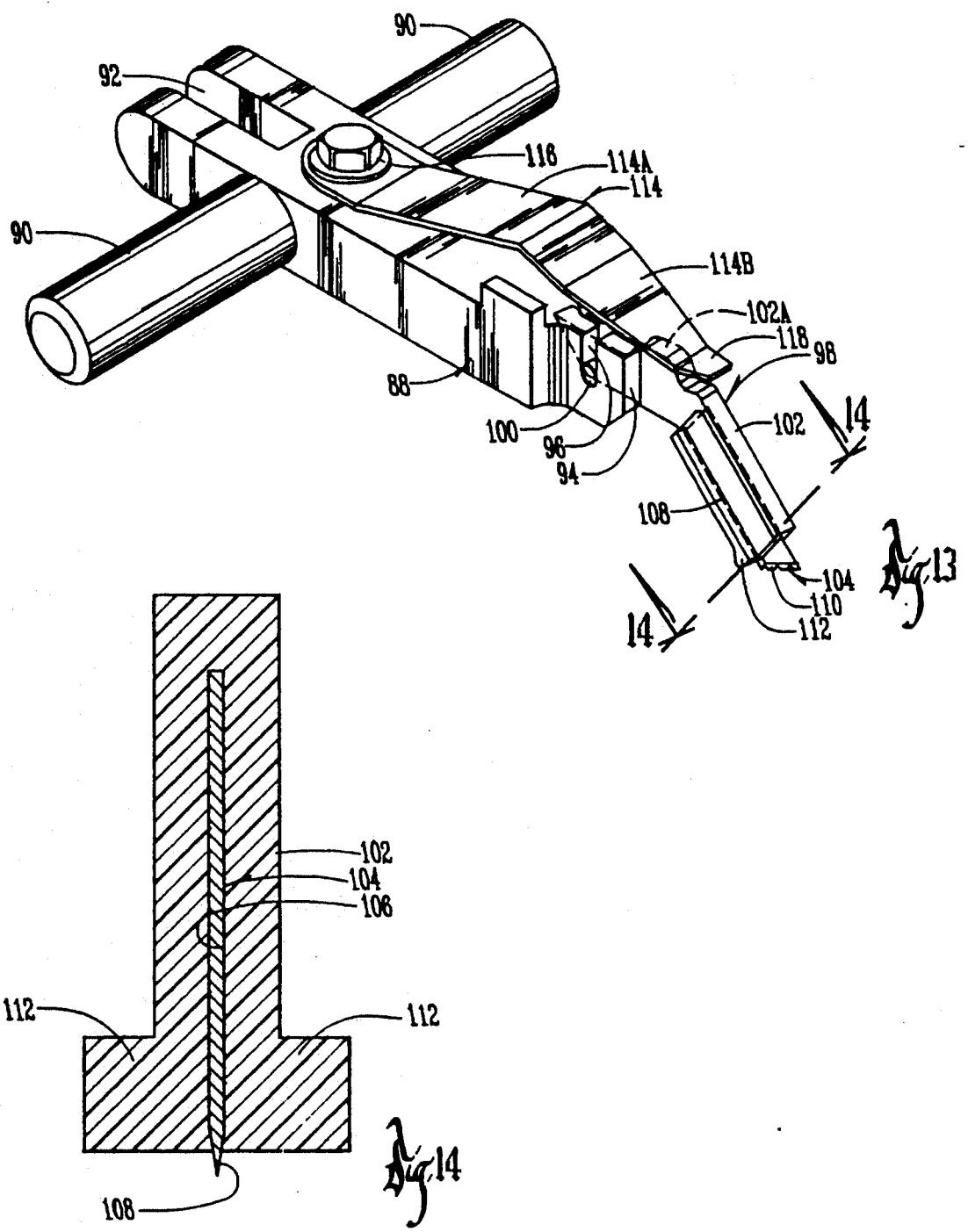

METHOD AND MEANS FOR REMOVING CASINGS FROM SAUSAGES

BACKGROUND OF THE INVENTION

Sausages, wieners, and the like are conventionally made by extruding a meat emulsion into an elongated hollow cylindrical casing. The casing is then rotated and twisted at given intervals to create a chain or string of linked casings with each linked casing encompassing a single sausage or wiener. This string of linked casings is conventionally deposited on a conveyor device and taken to a smoke house where the encased meat emulsion is cooked. Then, before the sausage or wieners are packaged for sale to the consumer, the casing material is removed from the cooked meat emulsion. Devices which remove the casing material are commonly referred to as "peelers" in the industry.

Existing peelers typically use steam to loosen the casing material from the cooked meat emulsion; a knife element thereupon slits the casing material; and a blast of compressed air is sometimes used to cause the casing material to be removed from the cooked and finished meat product.

Existing peelers have certain shortcomings. First of all, the knife elements used for the slitting operation often cut too deep and damage the cooked meat emulsion. Further, the knife elements are not adapted to slice adequately the casing at the ends of the sausage or wieners where the adjacent products are linked. As a result, the casing material must be torn from the cooked product at the ends thereof where the casing has not been effectively sliced.

In addition, with existing peelers, it is sometimes difficult to separate or pull the casing material from the ends of a sausage or wiener by virtue of the geometry of the product at the linked portions between individual linked products. This difficulty flows from the fact that the casing material being removed is not being pulled at a right angle with respect to the surface of the meat product.

A further shortcoming of existing peelers is that while steam is used to loosen the casing material from the cooked product, the product and the components engaging the product are often heated to a relatively high temperature, but less than 150° F. or so. Thus, even with steam entering existing peelers at a temperature of 180° F. or above, heat losses experienced in these devices permit the effective temperature of the meat product and the equipment to fall below the 150° F. level. The problem that this creates is that bacteria thrive in this heated condition up to 150° F. or so, and this compounds the cleaning responsibilities for the machine and in some cases could contaminate the food product.

It is therefore a principal object of this invention to provide a method and means for removing casings from sausages or the like which has a cutting blade that will not damage the meat product while the casing is being sliced;

A further object of this invention is to provide a method and means for removing casings from sausages or the like wherein the encased linked meat product can have the casing material effectively sliced at the ends thereof as well as throughout the length thereof;

A still further object of this invention is to provide a method and means for removing casings from sausages or the like wherein force is exerted on the linked product to expel the product from the casing material and to maintain the casing material being removed at an efficient angle of departure from the meat product to enhance the casing removal phenomena.

A still further object of this invention is to provide a method and means for removing casings from sausages or the like wherein steam is propelled through the conduit carrying the linked product to be peeled, and the temperature of the steam is retained within tee apparatus throughout the peeling operation to a level above 150° F. to sanitize the product and the equipment, and to prevent the steam from surrounding the environment of the apparatus.

A still further object of this invention is to provide a method and means for removing casings from sausages or the like wherein the peeling apparatus can be easily disassembled without tools; and where the entire machine is sanitary and easily cleaned, including the outside surface thereof, none of which are horizontal so as to provide immediate and automatic drainage.

These and other objects will be apparent to those skilled in the art.

SUMMARY OF THE INVENTION

The apparatus for removing casings from sausages has a frame, and a conduit extending within the frame through which a string of linked sausages are longitudinally moved. A knife means is pivotally mounted in the longitudinal path of the linked sausages and is capable of moving into the recessed portions of the string existing between adjacent ends of the linked product to sever the casing material in that area. A spin jump paddle is pivotally and transversely mounted in the path of the string of sausages downstream from the knife element so that the casings will pass thereover. The paddle has a width greater than its thickness and will rotate from a flat position to a vertical position depending on the portion of a linked product that is passing thereover. The casing material being removed from the linked product passes over the paddle and downwardly to a pair of gripping rolls.

Steam is injected into the conduit and diverted through the length thereof to loosen the casing material from the cooked product. The conduit is comprised of a highly insulative material so that the heat of the steam will be retained and maintained at a temperature of above 150° F. throughout the conduit and the area of the casing slitting and casing removal operations.

BRIEF DESCRIPTION OF THE DRAWINGS

FIG. 1 is a perspective view of the device of this invention;

FIG. 2 is an end elevational view thereof as seen from the lefthand side of FIG. 1;

FIGS. 3, 4 and 5 are schematic elevational views of linked sausages passing over the spin jump paddle as the casing material is being removed;

FIG. 6 is a side elevational view of the slitting mechanism cutting a slit in the center portion of a linked product;

FIG. 7 is a view similar to that of FIG. 6 but shows the knife mechanism slitting the casing at one end portion thereof;

FIG. 8 is a view similar to that of FIG. 7 but shows the knife element slicing the casing material at the end portion of an adjacent linked product;

FIG. 9 is an enlarged scale sectional view taken on line 9—9 of FIG. 1;

FIG. 12 is an exploded perspective view of the peeling mechanism;

FIG. 13 is an enlarged scale perspective view of the blade assembly; and

FIG. 14 is a sectional view take on line 14—14 of FIG. 13.

DESCRIPTION OF THE PREFERRED EMBODIMENT

Figure 10:
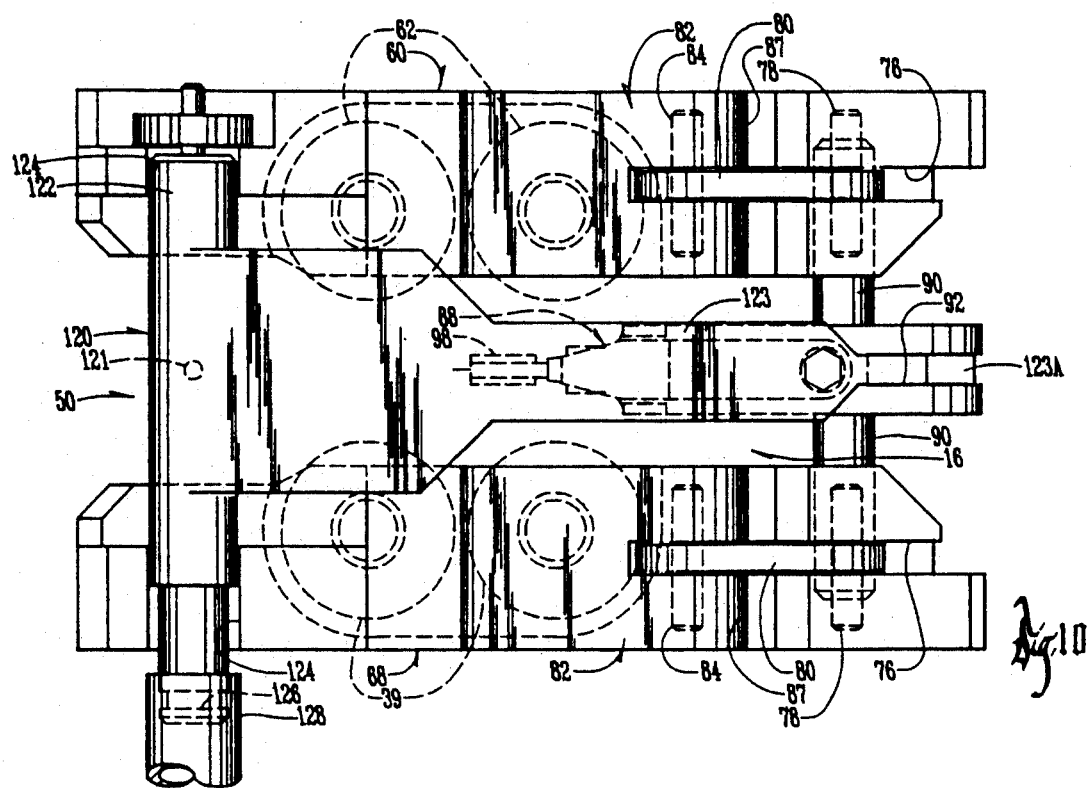
FIG. 10 is a sectional view taken on line 10—10 of FIG. 9.

With reference to FIG. 1, the numeral 10 designates the peeler machine of this invention which has a frame 12, a hopper and a peeler compartment 16. A cover 18 fits over compartment 16 and has an exit port 18A (FIG. 2) and an inlet port 20 (FIG. 1). A control panel is designated by the numeral 22. An access door 24 in machine 10 contains a removable basket (not shown) which accumulates the casing material removed from the encasing sausages.

For purposes of this invention, the term "sausages" is intended to include sausages, wieners, and all manner of such products which are comprised in the manufacturing process of a meat emulsion that is encased in a casing material wherein the casing material is twisted at different points to create individual links in the product.

With reference to FIGS. 9 and 12, the numeral 26 designates a center block having a top surface 28, a rearward end 30, and a center cavity 32. A slot opening 34 in rearward end 30 is in communication with center cavity 32. As will be explained hereafter, steam in the system is pulled through opening 34 from cavity 32 and the surrounding area for exit through a vacuum port 44. A bottom dowel 36 extends downwardly from center block 26 and is received in a suitable aperture in machine 10 (not shown) to releasably secure the center block to the machine. Two separate power shafts 38 extend upwardly from machine 10 into compartment 16 and are secured to a source of rotational power (not shown). Drive rollers 39 are mounted on the upper ends of shafts 38.

Horizontal gripping rolls 40 and 42 extend horizontally through compartment 16 from machine 10 and are connected to a source of rotational power (not shown). The upper roll 40 and the lower roll 42 are vertically spaced with respect to the vacuum port 44 which is located in the bottom of compartment 16.

A U-shaped exit block 46 is adapted to be attached to the rearward end 30 of center block 26 by dowel pins 48. Exit block 46 has a center opening 50 and side openings 52 which accommodate gripping rolls 40 and 42. Parallel spaced ribs 54 extend transversely across exit block 46 to rotatably support spin jump paddle 56 which has oppositely extending stub shafts 58 which are rotatably secured between pairs of ribs 54. It should be noted that spin jump paddle 56 has a width that is substantially greater than its thickness.

Idler side block 60 is slidably mounted on the top surface 28 of center block 26 and is adapted for transverse sliding movement for adjustment purposes on the top surface 28. Idler rollers 62 are rotatably mounted on downwardly extending shafts 64 which are secured by their upper ends to the idler side block 60 (FIG. 9). Rollers 62 are positioned opposite drive rollers 39.

A drive side block 68 is also mounted on the top surface 28 of center block 26 and is held against lateral movement by vertical dowel 70. Side block 68 can be vertically removed from center block 68 by being lifted vertically off of dowel 70.

The idler side block 60 and the drive side block 68 are substantially similar in configuration and are spaced apart to form a pathway for a string of linked sausages that will be moving therethrough for purposes of being peeled. Each block 60 and 68 has a substantially vertical slot 72 with a horizontal aperture 74 formed therein. A second vertical slot 75 is formed in each block and extends in a substantially vertical direction. An elongated slot 76 intersects both of the slots 72 and 75.

A pin 78 extends through each of the blocks 60 and 68 and rotatably supports one end of link 80. A cam lock 82 is mounted on each of the blocks 60 and 68 and is rotatably supported by pin 84 to the other end of link 80. Each cam lock 82 has a cam surface 86 which is adapted to engage the cam wall 87 which extends upwardly between slots 72 and 75.

With reference to FIG. 12, a blade support arm 88 has shafts 90 extending in a lateral direction from opposite sides thereof. The shafts 90 are adapted to be received in the apertures 74 of the side block 60 and 68. When the cam locks 82 are in the position shown in FIG. 12, the shafts 90 are locked within apertures 74 as cam surface 86 exerts pressure on cam wall 87 whereupon the portions of blocks 60 and 68 adjacent slot 72 are narrowed by reason of link 80, whereupon aperture 74 tightly grips the shafts 90. When cam locks 82 are rotated to a vertical position, links 80 release the pulling pressure which narrows slots 72, and the shafts 90 are then freely rotatable and even slidably removable from apertures 74.

A longitudinal slot 92 is located in the forward end of blade support arm 88. The rearward end of support arm 88 terminates in spaced tabs 94 which are adjacent a vertical slot 96.

A blade assembly 98 has oppositely and transversely extending shaft elements 100 projecting outwardly from one end thereof (FIG. 13). Blade arm 102 has a longitudinally positioned preset blade 104 inserted therein within longitudinal slot 106 (FIG. 14). Blade 104 has an elongated cutting edge 108 that is positioned on the under side of blade arm 102, and an angled cutting edge 110 that protrudes outwardly from the rearward end of the blade arm 102. A transversely extending shoulder 112 on the rearward end of blade arm 102 limits the depth (preferably 0.012") that blade 104 can cut into an encased sausage. The shafts 100 are pivotally and detachably mounted in vertical slot 96 in blade support arm 88. When the blade 104 becomes dull, the entire blade arm is thrown away and replaced with a new blade arm containing a new blade.

A spring 114 is secured to blade assembly 98 by bolt 116. The numeral 118 designates the outer end of spring 114. The spring portion 114A is bent upwardly at bolt 116, and portion 114B extends downwardly and outwardly from portion 114A towards end 118. Portion 114B is adapted to resiliently exert downward pressure on blade arm 102 as shown in FIGS. 6–8. Blade arm 102 is very lightweight and thus has a very low rotary moment of inertia. This allows the blade to follow the contour of the sausage at high speed without applying a high force on the sausage.

An air jet manifold (FIGS. 9 and 12) has a cross member 122 which has ends which are rotatably mounted in notches 124 which appear at the upper rearward ends of the block 60 and 68. Cross member 122 has a vertically disposed and centrally located air exit port 121 (FIG. 9). Arm 123 extends forwardly from cross member 122 and terminates in tab 123A. Tab 123A is detachably inserted into slot 92 of blade support arm 88 to keep air exit port 121 aligned with blade 104 to be described hereafter. The end 126 of manifold 120 has a sealing ring thereon and is snapped into the compressed air port 128 shown in FIG. 12.

Compartment 16 has an entry port 130 through which the string of linked sausages enters the compartment (FIG. 12). A pivotally mounted sensor 132 is located in the forward center end of the top surface 28 of center block 26 immediately adjacent entry port 130 and serves the purpose of causing compressed air to flow through air port 128 only when sensor 132 senses that sausages are moving through port 130 in a direction between the block 60 and 68. The conventional circuitry of sensor 132 is not shown.

With reference to FIG. 9, a plastic hollow conduit or steam tube 134 is mounted in a bore 136 which extends between inlet port 20 and entry port 130. Conduit 134 is preferably comprised of a highly insulative plastic material known in the trade as polysulfone. Inlet port 20 contains floored portion 138 of conduit 134 to facilitate the entry of a string of linked sausages.

With reference to FIG. 9, conduit 134 has a rim 140 adjacent inlet port 120 which the operator can grasp to insert the conduit into bore 136 or to remove the conduit therefrom. The rim and conduit 140 are rotated in one direction to affix the conduit within bore 136, and are rotated the other direction when it is desired to dislodge the conduit for removal purposes. A bayonet connecter (not shown) or the like is used to accommodate the connection and disconnection of conduit 134 with respect to bore 136.

A seal element 144 is positioned within a suitable annular groove in conduit 134 to seal the conduit to machine 10. A second seal 146 serves to seal the conduit within the bore 136 to create a sealed steam space 154 to be discussed hereafter. A steam introduction zone 148 in conduit 134 is comprised of a plurality of steam jet passageways 150 which extend diagonally through the walls of conduit 134 in a direction away from inlet port 20 towards compartment 16. A steam inlet port 152 is in communication with the steam space 154 to permit a supply of steam having a temperature of at least 180° F. into the steam jet passageways 150.

A string of casing sections 156 (FIG. 6) comprising a plurality of individual filled casing sections 158 are placed in hopper 14 after the filled casings have been cooked and removed from the smokehouse. Each casing section 158 has rounded end portions 160 on opposite ends thereof, with adjacent ends of each section being separated by a linked portion 162 of substantially reduced diameter. Linked portions 162 are created by a twist in the casing material 164 which encases the cooked meat emulsion 166 (FIG. 6). With reference to FIG. 9, the string of casing sections 156 is fed into conduit 134 through flared portion 138. Suitable controls in control panel coordinate the activity to be described. Steam having a temperature of at least 180° F. is introduced into space 154. This steam passes through diagonal passages 150 and is thus propelled longitudinally through conduit 134 in a lefthand direction as viewed in FIG. 9. The steam serves the purpose of loosening the casing material 164 on the filled casing sections 158. All of the steam passing through passages 150 moves towards the peeling apparatus. This movement of the steam creates a venturi effect at port 20 which causes a slight amount of outside air to be entrained into the conduit 134. Thus, no steam is allowed to escape out of the port 20 into the surrounding environment.

The string of casing sections 156 then enters compartment 16 through entry port 130. As they pass over sensor 132, compressed air is released through port 128 into air jet manifold 120 to create a blast of air that extends downwardly through air jet exit port 121 (FIG. 9). The string of casing sections 156 is grasped by drive rolls 39. The string of casing sections is encompassed by the drive rolls 39 and the idler rollers 62.

Figure 11:
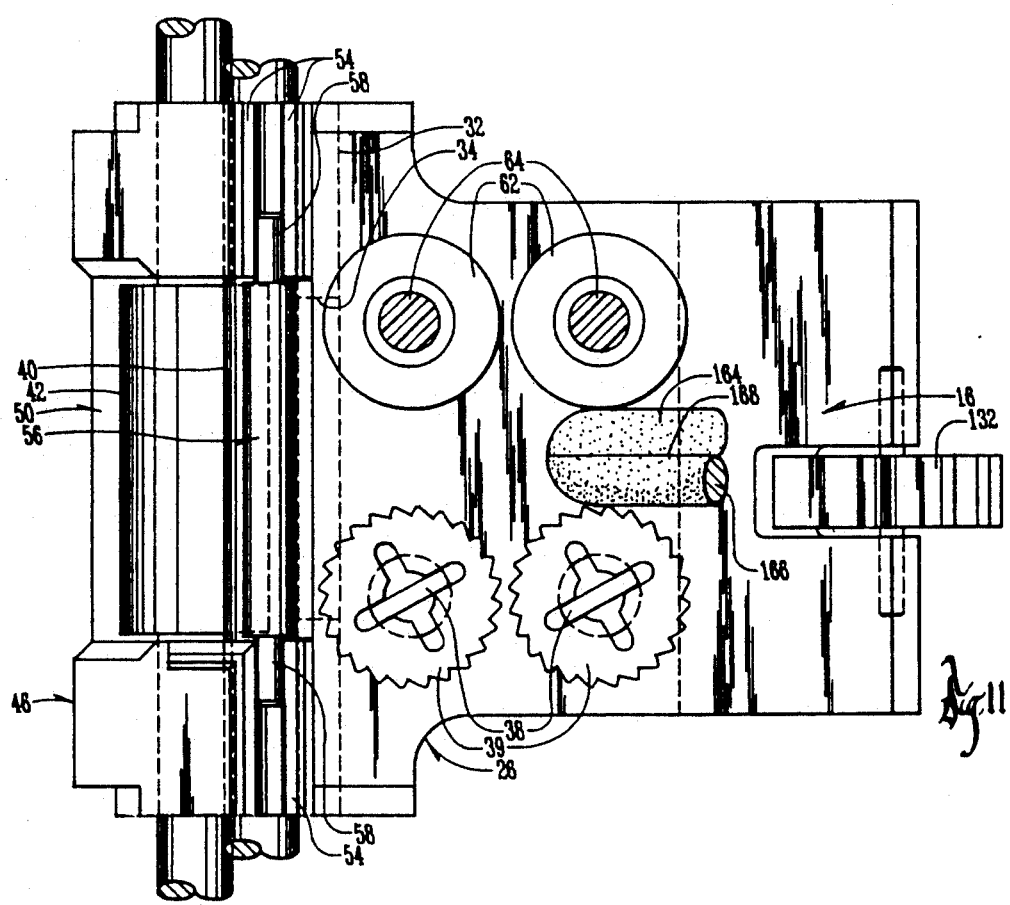
FIG. 11 is a sectional view taken on line 11—11 of FIG. 9.

As shown in FIG. 6, the blade 104 is forced down on casing section 158 and cuts an elongated slit 168 (FIG. 11) in the casing. The depth of the cut is limited by the shoulder 112 on the blade arm. As shown in FIG. 7 and 8, spring 114 causes the blade arm 102 to move down into the linked portion 162 created by the rounded end portions 160 of adjacent casing sections 158. Elongated cutting edge 108 of blade 104 cuts the rounded end 160 of a first casing section as the blade moves down into the linked portion 162, and the angled cutting edge 120 cuts the casing on the adjacent rounded end portion of the next casing section as the blade moves up out of the linked portion 162. This is a substantial improvement over existing peelers which cannot conduct a slit in the casing materials in the linked portions.

After the blade 104 has made the slit in the casing material of the casing sections 158, the casing sections move to the location of the spin jump paddle 56 which is located directly below the blast of compressed air coming from above through port 121. The air tends to separate the slit casing from the cooked meat emulsion 166. The spin jump paddle 56 facilitates this separation by maintaining the removed casing material at a substantial right angle to the surface of the product 166. As shown in FIG. 3, the paddle 56 is pivoted to a flat condition as the center portion of a filled casing section 158 passes thereover. As the casing material 164 is pulled downwardly through rolls 40 and 42, the paddle essentially maintains the casing material at a right angle with respect to the surface of the casing section 158.

When a linked portion 162 passes over paddle 56, the paddle moves to a pivoted position shown in FIG. 4 as it moves into the linked portion 162 to again maintain the normal attitude between the casing material being removed and the surface of the round end portion 160 of the product 166. With reference to FIG. 5, the paddle 56 when in its vertical position will deflect a casing passing thereover upwardly which serves the function of expelling the cooked meat emulsion product 166 from the casing material 164. This deflection of the sausage 166 in FIG. 5 is effective when it is considered that the casing sections are moving over paddle 56 at the rate of approximately 750 per minute.

The high insulative quality of conduit 134 preserves the heat content of the steam and maintains the temperature within the conduit at above 150°. This hot steam then moves into compartment 16 and surrounds the string of casing sections 156 as it passes through the peeling operation. The steam surrounds the blade support arm 88 and the related components and moves downwardly along the sides of blocks 60 and 68, and center block 26, through center cavity 32 in the center block, and is pulled rearwardly through narrow slot 34 (FIG. 12) and thence downwardly through vacuum port 44. The steam is condensed as it moves through the vacuum conduit and is therefore not allowed to enter the environment on the outside of machine 10. The high temperature of the steam above 150° F. is maintained throughout its passage through compartment 16 at least through slot 34 to retard any bacterial action within the operating areas of the unit.

Cover 18 normally is in place over compartment 16 during the peeling operation, and the peeled products 166 exit machine 10 through exit port 18A where they are collected and suitably packaged. The separated casing materials move downwardly from rolls 40 and 42 through vacuum port 44 and are collected in a suitable container (not shown) within the machine 10 to which access is gained by door 24.

The blocks of 26, 60, 68 and related components are all comprised of a plastic material (preferably delron). The apparatus within compartment 16 can be easily disassembled without the use of tools. When the cover 18 is removed from compartment 16, the side blocks 60 and 68 interconnected by blade support arm 88 can be vertically removed from center block 26 by merely lifting the side blocks in an upwardly direction. Side blocks can be removed from each other by operating the cam locks 82 as described above whereupon the blade support arm 88 can also be removed. The center block 26 can be lifted out of compartment 16 through the function of dowels 36 as described heretofore. The exit block 46 can be slidably removed from center block 26 by reason of the slidable connection of dowel pins 48.

From the foregoing, it is seen that this invention achieves at least all of its stated objectives.

I claim:

1. An apparatus for slitting the casing on connected encased sausages wherein said sausages are comprised of a plurality of cylindrical casing sections filled with sausage material with each casing section being reduced in diameter at its opposite ends and presenting a rounded end portion as said casing is drawn to said reduced diameter by a link portion, said apparatus comprising, a frame means, a conduit in said frame means through which a string of linked sausages are longitudinally moved, a knife means pivotally mounted in said conduit in the longitudinal path of said string of sausages, said knife means including a blade element having a size and shape that it can ride longitudinally on said cylindrical casing sections as said casing sections move through said conduit, and can substantially follow said rounded end portions of adjacent casing sections to substantially slice the casing on said rounded end portions a said blade element pivots first downwardly over a first rounded end portion on one cylindrical casing section, and thence pivots upwardly over a second rounded end portion on an adjacent cylindrical casing section, said blade having two separate cutting edges, one edge to slice said casing sections on said first rounded end portion, and the other edge to slice said casing on said second rounded end portion.

2. The apparatus of claim 1 wherein said conduit has a plurality of passages formed therein upstream from said knife means and angled in a direction towards said knife means, and means for introducing steam into said conduit through said passageways whereupon said angled passageways will direct substantially all of said steam through said conduit toward said knife means.

3. The apparatus of claim 2 wherein said conduit has an inlet end into which said string of linked sausages are longitudinally moved; said steam flowing though said angled passageways into said conduit creating a venturi effect which introduces outside air into said conduit for entrainment with said steam.

4. The apparatus of claim 1 wherein spring means is mounted on said knife means to yieldingly hold said blade element in contact with the longitudinal contour of casing sections moving through said conduit.

5. The apparatus of claim 1 wherein said knife means includes shoulder means which limits the penetration of said blade element into said casing sections to substantially the thickness of said casing.

6. The apparatus of claim 1 wherein said conduit is comprised of a heat insulative material.

7. An apparatus for removing casing material from connected encased sausages wherein said sausages are comprised of a plurality of cylindrical casing sections filled with sausage material with each casing section being reduced in diameter at its opposite ends and presenting a rounded end portion as said casing is drawn to said reduced diameter by a link portion, said apparatus comprising, a frame means, a conduit in said frame means through which a string of linked sausages are longitudinally moved, a knife means pivotally mounted in said conduit in the longitudinal path of said string of sausages; said knife means being adapted to substantially longitudinally slit the casing on said casing sections, a spin jump paddle pivotally and transversely mounted in said conduit downstream from said knife means, said paddle being positioned in said conduit so that said cylindrical casings will pass over said paddle;

said paddle having a width greater than its thickness, an open space existing below said paddle so that casing material loosened from said casing sections will move downwardly into said open space over said paddle, gripping rolls mounted in said space below said paddle to grip and pull on said loosened casing material, said paddle moving from a first position where the width of said paddle lays parallel to the direction of movement of said casing sections of a second position where the width of said paddle lays substantially perpendicular to the direction of movement of said casing sections as said rounded end portion of said casing sections move over said paddle.

8. The apparatus of claim 1 wherein said paddle when in said second position can lift said casing sections from their normal horizontal movement though said tube to enhance the removal of casing material from said casing sections by creating a substantial perpendicular angle of pull as said loosened casing material is being pulled from said rounded end portions of said casing sections.

9. The apparatus of claim 7 wherein said conduit has a first air supply means downstream from said knife means for directing a blast of air on said casing sections, and a vacuum port opposite said air supply means whereupon steam in said conduit will move into said vacuum port.

10. The apparatus of claim 9 wherein a sensor means is mounted on said frame means in said path of said string of sausages, said sensor means being operatively connected to said air supply means and adapted to permit said blast of air to be directed only when casing sections are moving through said conduit.

11. The apparatus of claim 7 wherein said conduit is comprised of a heat insulative material.

12. The apparatus for removing casing material from connected encased sausages wherein said sausages are comprised of a plurality of cylindrical casing sections filled with sausage material with each casing section being reduced in diameter at its opposite ends and presenting a rounded end portion as said casing is drawn to said reduced diameter by a link portion, said apparatus comprising,
- a frame means,
- a conduit in said frame means through which a string of linked sausages are longitudinally moved,
- a knife means pivotally mounted in said conduit in the longitudinal path of said string of sausages; said knife means being adapted to substantially longitudinally slit the casing on said casing sections,
- a spin jump paddle pivotally and transversely mounted in said conduit downstream from
- said conduit has a plurality of passages formed herein upstream from said knife mean and angled in a direction towards said knife mean,
- and means for introducing steam into said conduit through said passageways whereupon said angled passageways will direct said steam through said conduit.

13. The apparatus of claim 12 wherein said conduit has a first air supply means downstream from said knife means for directing a blast of air on said casing sections, and a vacuum port opposite said air supply means whereupon steam in said conduit will move into said vacuum port.

14. The method of slitting the casing on connected encased sausage wherein said sausages are comprised of a plurality of cylindrical casing sections filled with sausage material with each casing section being reduced in diameter at its opposite ends and presenting a rounded end portion as said casing is drawn to said reduced diameter by a link portion, said method comprising,
- moving said connected encased sausages in a longitudinal direction,
- positioning a knife blade over said encased sausages to cut a slit in the casing of each casing section as it passes under said knife blade, and
- allowing said knife blade to engage substantially the entire longitudinal contour of said encased sausages to permit said knife blade to move into contact with said rounded end portions of said casings sections to cut a slit in the casing at said rounded end portions by providing separate cutting edges on said knife blade to sequentially cut a slit in the rounded end portions of adjacent casing sections.

15. The apparatus of claim 1 wherein said knife means has a shoulder element thereon to engage said casing sections to limit the depth of cut in said casing sections by said blade element.

16. The method of removing the casing connected encased sausages, comprising,
- introducing a string of connected encased sausages into an elongated conduit of a casing removal apparatus, and moving said sausages through said conduit and thence into a casing removing chamber,
- introducing steam having a minimum temperature of approximately 180° F. into said conduit and directing said steam in a direction through said conduit in the direction of movement of said string of connected casings, and thence into said casing removing chamber;
- removing said casings from said connected encased sausages within said casing removing chamber, and
- maintaining the temperature of said steam in said conduit above 150° F.

17. The method of claim 16 wherein said steam is withdrawn from said casing removing chamber and condensed whereby said steam is substantially prevented from entering the environment surrounding said apparatus.

18. The apparatus for slitting the casing on connected encased sausages wherein said sausages are comprised of a plurality of cylindrical casing sections filled with sausage material with each casing section being reduced in diameter at its opposite ends and presenting a rounded end portion as said casing its drawn to said reduced diameter by a link portion, said apparatus comprising,
- a frame means,
- a conduit in said frame means through which a string of linked sausages are longitudinally moved,
- a knife means pivotally mounted in said conduit in the longitudinal path of said string of sausages,
- said knife means including a blade element having a size and shape that it can ride longitudinally on said cylindrical casing sections as said casing sections move through said conduit, and can substantially follow said rounded end portions of adjacent casing sections to substantially slice the casing on said rounded end portions as said blade element pivots first downwardly over a first rounded end portion on one cylindrical casing section, and thence pivots upwardly over a second rounded end portion on an adjacent cylindrical casing section,
- a spin jump paddle is pivotally and transversely mounted in said conduit downstream from said knife means,
- said paddle being positioned in said conduit so that said cylindrical casings will pass over said paddle;
- said paddle having a width greater than its thickness,
- an open space existing below said paddle so that casing material loosened from said casing sections will move downwardly into said open space over said paddle,
- gripping rolls mounted in said space below said paddle to grip and pull on said loosened casing material,
- said paddle moving from a first position where the width of said paddle lays parallel to the direction of movement of said casing sections to a second position where the width of said paddle lays substantially perpendicular to the direction of movement of said casing sections as said rounded end portions of said casing sections move over said paddle.

19. The apparatus of claim 18 wherein said paddle when in said second position can lift said casing sections from their normal horizontal movement through said tube to enhance the removal of casing material from said casing sections by creating a substantial perpendicular angle of pull as said loosened casing material is being pulled from said rounded end portions of said casing sections.

20. The apparatus of claim 18 wherein said paddle when in said second position can lift said casing sections from their normal horizontal movement through said tube to enhance the removal of casing material from said casing sections by creating a continuously perpendicular angle to pull as said loosened casing material is being pulled from said rounded end portions of said casing sections.

21. An apparatus for slitting the casing on connected encased sausages wherein said sausages are comprised of a plurality of cylindrical casing sections filled with sausage material with each casing section being reduce din diameter at its opposite ends and presenting a rounded end portion as said casing is drawn to said reduced diameter by a link portion, said apparatus comprising,
- a frame means,
- a conduit in said frame means through which a string of linked sausages are longitudinally moved,
- a knife means pivotally mounted in said conduit in the longitudinal path of said string of sausages,
- said knife means including a blade element having a size and shape that it can ride longitudinally on said cylindrical casing sections as said casing sections move through said conduit, and can substantially follow said rounded end portions of adjacent casing sections to substantially slice the casing on said rounded end portions as said blade element pivots first downwardly over a first rounded end portion on one cylindrical casing section, and thence pivots upwardly over a second rounded end portion on an adjacent cylindrical casing section,
- said conduit having a first air supply means downstream from said knife means for directing a blast of air on said casings sections,
- and a vacuum port opposite said air supply means whereupon steam in said conduit will move into said vacuum port.

22. The apparatus of claim 21 wherein a sensor means is mounted on said frame means in said path of said string of sausages, said sensor means being operatively connected to said air supply means and adapted to permit said blast of air to be directed only when casing sections are moving through said conduit.

23. The method of slitting the casing on connected encased sausage wherein said sausages are comprised of a plurality of cylindrical casing sections filled with sausage material with each casing section being reduce din diameter at its opposite ends and presenting a rounded end portions as said casing is drawn to said reduced diameter by a link portion, said method comprising,
- moving said connected encased sausage in a longitudinal direction,
- positioning a knife blade over said encased sausages to cut a slit in the casing of each casing section as it passes under said knife blade,
- allowing said knife blade to engage substantially the entire longitudinal contour of said encased sausages to permit said knife blade to move into contact with said rounded end portions of said casing sections to cut a slit in the casing at said rounded end portions and imposing a blast of air on said casings only when said casings are moving through said conduit.

24. The method of removing the casing connected encased sausages, comprising,
- introducing a string of connected encased sausages into an elongated conduit of a casing removal apparatus, and moving said sausages through said conduit and thence into a casing removing chamber,
- introducing steam having a minimum temperature of approximately 180° F. into said conduits and directing said steam in a direction through said conduit in the direction of movement of said string of connected casings, and thence into said casing removing chamber;
- removing said casings from said connected encased sausages within said casing removing chamber, and
- maintaining the temperature of said steam in said conduit above 150° F., and
- imposing a blast of air on said casing sections, and said blast of air is applied only when casing sections are moving though said conduit.

* * * * *